United States Patent [19]

Klauminzer

[11] 4,127,828

[45] * Nov. 28, 1978

[54] OPTICAL BEAM EXPANDER FOR DYE LASER

[75] Inventor: Gary K. Klauminzer, Palo Alto, Calif.

[73] Assignee: Molectron Corporation, Sunnyvale, Calif.

[*] Notice: The portion of the term of this patent subsequent to Apr. 5, 1994, has been disclaimed.

[21] Appl. No.: 781,146

[22] Filed: Mar. 25, 1977

Related U.S. Application Data

[63] Continuation-in-part of Ser. No. 676,233, Apr. 12, 1976, Pat. No. 4,016,504.

[51] Int. Cl.² .............................................. H01S 3/02
[52] U.S. Cl. ................................ 331/94.5 C; 350/286
[58] Field of Search ..................... 331/94.5 C; 350/286

[56] References Cited

U.S. PATENT DOCUMENTS

| 3,508,166 | 4/1970 | Simmons et al. | 331/94.5 C |
| 3,609,590 | 9/1971 | Jernigan | 331/94.5 C |
| 3,735,283 | 5/1973 | Wuerker et al. | 331/94.5 C |
| 4,016,504 | 4/1977 | Klauminzer | 350/286 |

*Primary Examiner*—William L. Sikes
*Attorney, Agent, or Firm*—Schatzel & Hamrick

[57] ABSTRACT

A multiple prism beam expander for use in dye lasers and the like comprising two or more prisms positioned relative to each other and between a dye cell and diffraction grating such that laser light from the dye cell is passed through first one of the prisms and then another with at least two of the prisms serving to magnify the incident light beam in the plane of refraction common to both prisms.

13 Claims, 2 Drawing Figures

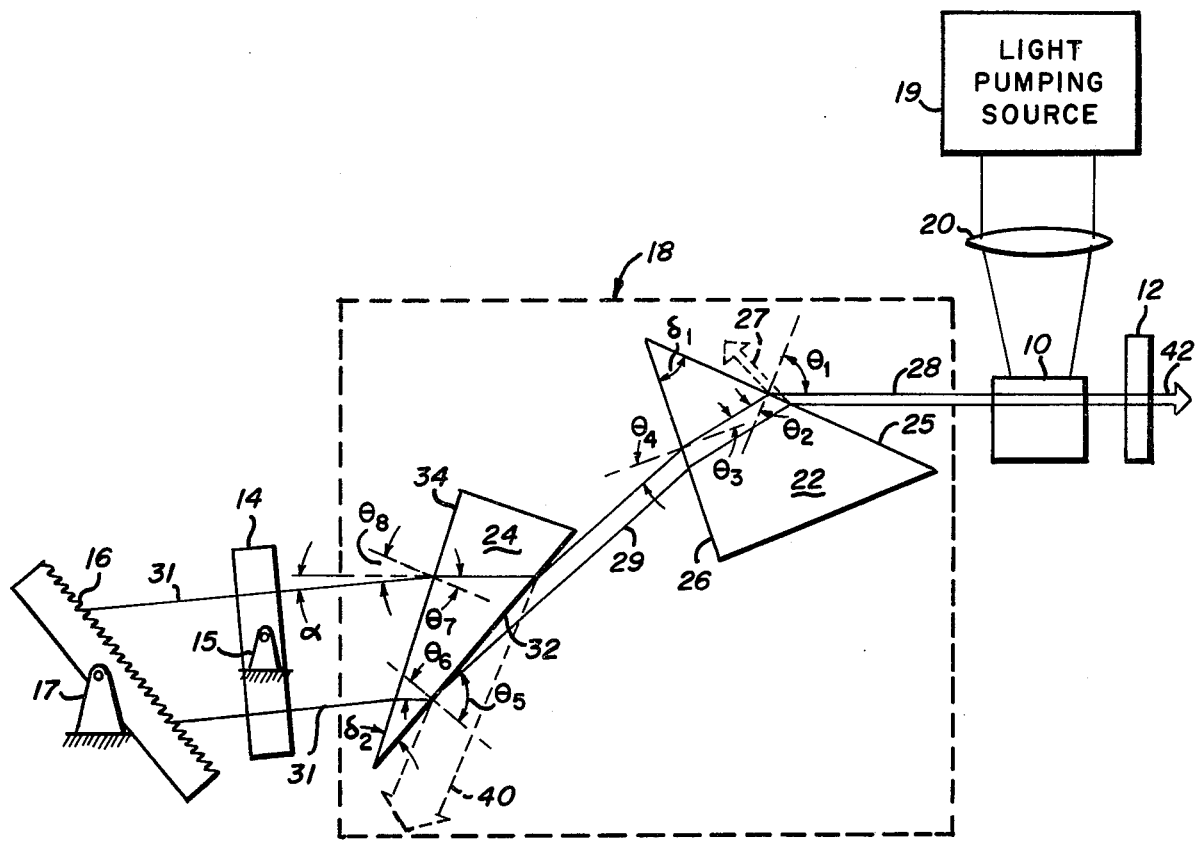
Fig_1
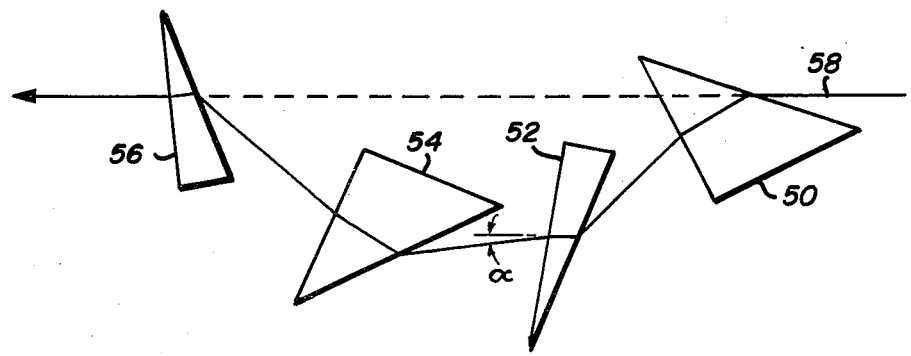
Fig_2

OPTICAL BEAM EXPANDER FOR DYE LASER

The present application is a continuation-in-part of my previous U.S. patent application entitled "Optical Beam Expander for Dye Laser," Ser. No. 676,233, filed Apr. 12, 1976 and now U.S. Pat. No. 4,016,504.

BACKGROUND OF THE INVENTION

1. Field of the Invention

The present invention relates generally to optical light beam expander apparatus and more particularly to a multiple-prism light beam expander system having particular applicability for use in dye lasers and optical parametric oscillators to narrow the bandwidth of the output laser beam.

2. Description of the Prior Art

A simple dye laser includes an optically pumped dye cell with a diffraction grating disposed on one side of the cell and an output mirror disposed on the other side. The diffraction grating is used as the wavelength selection device and permits the laser wavelength to be tuned within the fluorescence band of the particular dye used. While the output power of this basic type of dye laser is excellent, the linewidth is relatively poor because the cross sectional area of the beam cast onto the diffraction grating is small. To improve (i.e., reduce) the linewidth, some type of beam expanding device is usually inserted between the dye cell and the grating to expand the laser beam on the grating.

A telescope expander developed by Hänsch was the first beam expander breakthrough and has been used as the classical design since it was disclosed in *Applied Optics*, Volume 11, pp. 895–898 in April of 1972. Such apparatus is, however, subject to the disadvantages that it is expensive, it may have relatively poor beam quality due to imperfect, small radius-of-curvature spherical surfaces, it adds significantly to the cavity length, it expands the beam in two dimensions so that the intracavity etalon must be large and of extremely high quality, and the grating rotation mechanism must be extremely precise so that the grating grooves remain orthogonal to the laser axis as the grating rotates.

Two single-prism designs disclosed by Stokes et al in *Optics Communications*, Vol. 5, No. 4, Page 267, July of 1972, and Hanna et al in *Optical and Quantum Electronics* 7 (1975), 115–119, have also been used with varying degrees of success to overcome the deficiences of the telescope expander. However, neither has been satisfactory in that overcoming some of the deficiences of the telescope has invariably introduced others. For example, these types of expanders are not achromatic, in that the direction of the output beam is not constant, independent of wavelength, they must sacrifice power or tuning range in order to increase expansion (to reduce laser linewidth), they do not produce an output beam that is completely polarized, and they do not produce an output beam which is colinear or parallel with the input beam and thereby make alignment of the system difficult.

Another prior art dye laser structure using a cylindrical lens beam expanding system is disclosed in the U.S. Pat. No. 3,868,590 to Itzkan et al.

SUMMARY OF THE PRESENT INVENTION

It is therefore a principal object of the present invention to provide an optical beam-expander system for use in dye lasers which overcomes the deficiences of other prior art beam-expanding devices.

Briefly, the present invention is comprised of two or more prisms positioned relative to each other and between a dye cell and diffraction grating such that light from the dye cell is passed through first one of the prisms and then another with at least two of the prisms serving to magnify the incident light beam in the plane of refraction common to both prisms.

As will be discussed in more detail below, the present invention has the advantages that it is relatively inexpensive, is achromatic in that the expanded output beam is fixed in direction relative to the input beam for all wavelengths, is easy to align, provides good beam quality, and does not require the use of a polarizer. Furthermore by using more than two prisms, the expanded output beam can be made parallel or colinear to the input beam.

These and other objects and advantages of the present invention will no doubt become apparent to those skilled in the art after having read the following detailed description of the preferred embodiments which are illustrated in the drawing.

IN THE DRAWING

FIG. 1 is a schematic diagram illustrating a dye laser including an optical expander system in accordance with the present invention; and FIG. 2 is a schematic diagram illustrating an alternative embodiment of an optical expander system in accordance with the present invention.

DETAILED DESCRIPTION OF THE PREFERRED EMBODIMENT

Referring now to FIG. 1 of the drawing, there is shown a dye laser including a dye cell 10, a partially reflective mirror 12, an etalon 14, a diffraction grating 16 and a dual-prism beam expander 18. An optical cavity is formed between mirror 12 and grating 16 with the dye cell 10, beam expander 18 and etalon 14 defining an optical axis.

The dye cell 10 is generally comprised of a container filled with laseable material such as an organic dye and including optical windows as its end faces. In order to induce stimulated emission of radiation, the dye material within the container is excited by a beam of light from a light pumping source illustrated schematically at 19. The pumping beam is focused onto dye cell 10 through an aspheric focusing lens 20. The beam expander 18 is comprised of a pair of prisms 22 and 24 positioned so as to refract and expand light from dye cell 10 as illustrated.

In the preferred embodiment, the dye cell is a Molectron Model DL051 Cuvette Dye Cell made of fused silica. The output coupling mirror 12 is an uncoated fused silica substrate with a 30 minute wedge between surfaces to avoid reflections into the cavity from the surface facing away from the cavity. The etalon is a Molectron Model DL026 Intracavity Etalon made of fused silica, 3 mm thick with a dielectric reflection coating on both surfaces. Diffraction grating 16 is a Bausch & Lomb Model 35-63-06-460 having 600 grooves per mm and a blaze angle of 54°, 6'.

The dual prism assembly 18 is comprised of the two prisms 22 and 24 having hypotenuse dimensions of 9 mm for prism 22 and 22 mm for prism 24 and apex angles $\delta_1$ of approximately 42° for prism 22 and $\delta_2$ of approximately 13° for prism 24. The material for both prisms is fused silica and typical orientation angles are $\theta_1 = \theta_5 = 80°$ giving a total magnification of approximately 20. The light pumping source is a Molectron Model UV1000 nitrogen laser, and the focusing lens 20 is a Molectron Model DL015 Aspheric Focusing Lens made of fused silica. The total cavity length from mirror 12 to grating 16 is 180 mm.

Prism 22 is positioned to have its entrance face 25 angularly facing dye cell 10 so that laser radiation, illustrated by the lines 28, from cell 10 will be incident upon face 25 at an angle $\theta_1$. The incident beam will be both reflected as indicated by the dashed arrow 27 and refracted through prism 22 as indicated at 29 to emerge therefrom at an angle $\theta_4$ which in practice is usually close to orthogonal relative to the prism exit face 26. Note that in passing through prism 22 the laser beam 28 is expanded in the plane of the drawing to form a broader beam 29. The beam expansion $M_1$ of prism 22 in the place of refraction is given by the expression $$M_1 = \left[ \frac{\left(1 - \frac{\sin^2\theta_1}{n_1^2}\right)\left(1 - \sin^2\theta_4\right)}{\left(1 - \sin^2\theta_1\right)\left(1 - \frac{\sin^2\theta_4}{n_1^2}\right)} \right]^{\frac{1}{2}}$$

where $n_1$ is the refractive index of the prism 22 at the laser wavelength, and $\theta_1$ is the incidence angle, and $\theta_4$ is the exit angle. The terms involving $\theta_1$ account for a magnification of the beam at surface 25 while the terms involving $\theta_4$ account for a demagnification of the beam upon exiting surface 26. For small values of $\theta_4$, where the output beam is nearly orthogonal to the input beam, the demagnification terms have little contribution.

Although the choice of prism material is not critical, some care in the choice thereof may be necessary to insure adequate transmission at all possible lasing wavelengths. The prism should also be placed reasonably close to the cell 10 so that the laser cavity is kept as short as possible and the beam size $w$ at the prism is nearly the same as the waist size $w_0$ in the cell. The width $Mw$ of the expanded beam 29 as it leaves the prism is then essentially the same as its waist size $Mw_0$.

As indicated above, the beam expander 18 also includes a second prism 24 having a beam entrance face 32 and a beam exit face 34. Prism 24 is positioned so as to have its entrance face 32 intercepted by beam 29 at an angle of incidence of $\theta_5$ and its exit face 34 facing etalon 14. As with prism 22, the incident beam 29 will be both reflected, as indicated by the dashed arrow 40, and refracted through the prism 24 to emerge as indicated at 31 in a direction which is neither orthogonal to prism exit face 34 nor parallel to beam 28 incident on prism 22.

In passing through prism 24 the laser beam 29 is expanded as in prism 22; however, in this case the demagnification upon exit from face 34 may be significant. The total magnification for expansion of the beam expander 18 is then the product of the magnification for prism 22 with the magnification of the prism 24. Note, however that by carefully selecting and positioning the two prisms, any dispersion effects caused by prism 22 are cancelled by equal but opposite dispersion effects in prism 24. The total expansion through the dual prism expander 18 is therefore achromatic in that the exit beam is fixed in direction relative to the input beam for all wavelengths while the expansion through either prism 22 or 24 separately is not achromatic. However, the output beam from prism 24 is not parallel to the input beam to prism 22.

Upon exiting from prism 24 the expanded beam 31 is then passed through etalon 14 to the grooved face of diffraction grating 16, both of which function in a manner identical to that in the design of Hänsch; that is, the grating selects particular wavelengths within the fluorescence range of the dye while the etalon narrows the linewidth beyond that achieved with only the grating and beam expander. Both the etalon and grating are mounted as schematically illustrated at 15 and 17 so that they can be rotated to change the wavelength. Alternately an air-spaced etalon can be used, in which case the wavelength can also be changed by varying the pressure of the gas surrounding the grating and etalon.

In operation, the pumping source 19, laser, flashlamp or other source emits a pulse of radiation which is incident upon the dye in cell 10. In the particular case of a pulsed nitrogen laser pump, lens 20 focuses the pumping beam to a line just inside the outer surface of the dye cell 10 and lying along the axis of the optical cavity. This pumping radiation excites the molecules of the dye material to higher energy levels to provide the population inversion necessary for stimulated emission to occur in the laser material. The resulting emission by the laser material is then passed through beam expander 18 and etalon 14, and then onto the face of grating 16 where only light of a particular wavelength is returned back along the optical axis of the cavity. In passing back through the optical system the selected wavelength beam is contracted in width by the prisms 22 and 24 so that the returning beam at cell 10 is substantially the same width as the waist size $w_0$ of the cell 10. The output beam 42 then passes through mirror 12.

For those applications where it is necessary to have higher magnification, lower optical losses, or a parallel or colinear optical axis throughout the system, a combination of prisms such as is illustrated in FIG. 2 may be used in place of the expander 18 shown in FIG. 1. In this alternative embodiment, the first prism pair 50 and 52 operates exactly as does the prism pair 22 and 24 described earlier. The second prism pair 54 and 56 shown in FIG. 2 may be identical to the first pair but are oriented in such a manner as to both correct for the small angle deviation $\alpha$ of the beam exiting prism 52 and to make the output beam colinear to the input beam 58. The use of an additional prism pair provides a higher magnification for a given input angle to each prism. Conversely, for a given magnification, use of an additional prism pair allows a smaller incident angle to be used, thereby reducing the reflective losses at each prism input surface and increasing the transmission of the entire system.

While FIG. 2 indicates how four prisms may be used to produce an output beam which is colinear to the input beam at high magnification, other prism combinations can also produce the same result. However, the use of multiple prism pairs which are identical has the advantage that a single pair can be used in applications requiring either low cost or lower magnification and then the same prisms can be ganged as shown in FIG. 2 for more demanding applications requiring higher magnification and higher transmission.

In practice the prism expander performs the same function as the telescope expander in the Hänsch design in that it expands the beam on the grating in the prism plane of refraction (grating plane of diffraction) thereby reducing the beam divergence onto the grating by the expansion factor and illuminating more lines on the grating, both effects serving to reduce the linewidth of the laser output beam. In addition, like a telescope, it produces an expanded beam which is fixed in direction relative to the input beam for all wavelengths. This is important when selecting the grating wavelength with, for example, a mechanical sinedrive, since the operation of the sinedrive depends on a fixed beam direction onto the grating, i.e., one that does not change with wavelength.

The present expander offers performance superior to the telescope in that it is less expensive, it does not require a focus adjustment, and alignment is not as critical in that beam motion along an axis perpendicular to that plane of the drawing does not upset performance as it would for a telescope which is constrained along both axes perpendicular to the laser axis. Moreover, the expander can be made much shorter than a telescope of comparable expansion capability and optical quality, and thus improves dye laser efficiency for a given pumping pulse duration. In addition, the constraints on the grating rotation mechanism are less severe since the divergence of the beam at the grating is not reduced along the axis perpendicular to the plane of FIG. 1. Hence the grating is permitted a larger amount of tilt as it rotates before cavity alingment is upset. Tilt is defined as grating motion about an axis parallel to that axis defined by the intersection of the plane of the grating and the plane of FIG. 1, the grating rotation is defined as motion about an axis parallel to the grooves of the grating surface which are themselves perpendicular to the plane of FIG. 1.

The constraints on the optical quality of etalon 14 are also reduced by the present invention since the beam illuminates a smaller area of the etalon as a result of expansion in only one axis rather than two axes as in the case of the telescope. In accordance with the present invention the output beam is polarized in the plane of FIG. 1 without the need for a separate polarizing element, and excellent output beam quality is more readily achieved since there are no surfaces having a small radius of curvature as in the telescope.

Compared to the single prism designs of Stokes, et al. and Hanna, et al. the dual expander of the present invention has the advantage that the output beam to the grating is fixed in direction regardless of wavelength and by using more than two prisms can be made colinear to the input beam. In addition, the multiple prism expander provides better polarization of the output beam. Furthermore, as compared to the Stokes design, the present multiple prism expander offers higher magnification at a lower angle of incidence thus reducing losses and improving efficiency. As compared to the design of Hanna et al. in which the output beam is taken off the reflection from the prism input surface, the present multiple prism expansion results in a broader tuning range for each dye and avoids the superradiant background emission present in the Hanna design at low gain, particularly at the extremes of a dye tuning range.

Although the present invention has been described above with relation to several preferred embodiments, it is appreciated that certain alterations and modifications of the apparatus disclosed will no doubt become apparent to those skilled in the art after having read this disclosure. It is therefore intended that the appended claims be interpreted as covering all such alterations and modifications as fall within the true spirit and scope of the invention.

What is claimed is:

1. In a dye laser apparatus including a pair of spaced apart reflectors defining an optical cavity having a dye cell and a beam expander disposed within said cavity, and a light pumping source for optically exciting the dye to a lasing condition, an improved beam expander comprising:

a first prism having a first input surface aligned with the optical axis of the dye cell and inclined to have an incidence angle of $\theta_1$ relative thereto for receiving a light beam generated by said dye cell and a first output surface intersecting said first input surface at a first apex angle $\delta_1$, the incident beam being refracted by said first prism and the refracted beam emerging from said first output surface with an exit angle of $\theta_4$; and a second prism having a second input surface disposed opposite said first output surface and oriented relative thereto such that said refracted beam is incident thereupon with a second incidence angle $\theta_5$, and having a second output surface intersecting said second input surface at a second apex angle $\delta_2$ whereby said refracted beam is further refracted and emerges from said second output surface with a second exit angle $\theta_8$, the width of said further refracted beam being expanded relative to the beam incident on the first input surface in the plane of refraction by a factor of $M_1 \times M_2$ where $$M_1 = \left[ \frac{\left(1 - \frac{\sin^2\theta_1}{n_1^2}\right)\left(1 - \sin^2\theta_4\right)}{\left(1 - \sin^2\theta_1\right)\left(1 - \frac{\sin^2\theta_4}{n_1^2}\right)} \right]^{\frac{1}{2}}$$

$$M_2 = \left[ \frac{\left(1 - \frac{\sin^2\theta_5}{n_2^2}\right)\left(1 - \sin^2\theta_8\right)}{\left(1 - \sin^2\theta_5\right)\left(1 - \frac{\sin^2\theta_8}{n_2^2}\right)} \right]^{\frac{1}{2}}$$

2. In a dye laser apparatus as recited in claim 1 wherein said first and second prisms are both right angle prisms.

3. In a dye laser apparatus as recited in claim 1 wherein said first apex angle $\delta_1$ is larger than said second apex angle $\delta_2$.

4. In a dye laser apparatus as recited in claim 3 wherein said further refracted beam emerges from said second output surface at an angle $\alpha$ relative to a line parallel to the beam incident upon said first input surface.

5. In a dye laser apparatus as recited in claim 1 wherein the incidence angles $\theta_1$ and $\theta_5$ are equal.

6. In a dye laser apparatus as recited in claim 1 wherein said second prism has dispersion characteristics which are equal but opposite of those of said first prism thereby causing the beam output therefrom to be fixed in relation to said input prism for all wave lengths.

7. In a dye laser apparatus as recited in claim 1 and further comprising at least two additional prisms oriented relative to said second prism for further refracting the beam of light passing therethrough such that the output of the prism combination is fixed in position relative to the input beam for all wavelengths and is parallel to or colinear with the input beam.

8. In a dye laser apparatus as recited in claim 1 and further comprising a third prism substantially identical in configuration to said first prism and having a third input surface for receiving said further refracted beam and for again refracting the beam so that it emerges from a third output surface thereof; and a fourth prism substantially identical in configuration to said second prism and oriented relative to said third prism so as to receive said again refracted beam and to finally refract the beam so that upon emerging from said fourth prism it is directed parallel to or colinear with the input beam.

9. A multiple prism beam expander for use in dye laser apparatus and the like comprising:

a first prism having a first input surface for alignment with the optical axis of the laser and inclined at an incidence angle of $\theta_1$ relative thereto, and a first output surface angularly intersecting said first input surface at an angle $\delta_1$ such that a beam of light along said optical axis is refracted by said first prism to exit from said first output surface at an exit angle of $\theta_4$; and a second prism having a second input surface lying along the line of said refracted light and oriented at an incidence angle $\theta_5$ relative thereto, and a second output surface angularly intersecting said second input surface at an apex angle $\delta_2$ which is less than the apex angle $\delta_1$ said second prism further refracting the input beam of light such that the width of the resultant refracted beam of light is expanded in the plane of refraction.

10. A multiple prism beam expander as recited in claim 9 wherein said first and second prisms are both right angle prisms.

11. A multiple prism beam expander as recited in claim 9 and further comprising at least two additional prisms oriented relative to said second prism for further refracting the beam of light passing therethrough such that the output of the prism combination is fixed position relative to the input beam for all wavelengths and is parallel to or colinear with the input beam.

12. A multiple prism beam expander as recited in claim 9 and further comprising a third prism identical to said first prism and oriented relative to said second prism to receive and again refract the beam exiting from said second prism, and a fourth prism identical to said second prism and oriented relative to said third prism so as to finally refract the beam exiting from said third prism and cause it to be parallel to or colinear with the input beam as it emerges therefrom.

13. A multiple prism beam expander as recited in claim 9 wherein said second prism is oriented relative to said first prism such that the resulting dispersion cancels that introduced by said first prism thereby causing the beam output therefrom to be fixed in relation to said input beam for all wave lengths.

* * * * *